United States Patent
Lands et al.

(10) Patent No.: US 6,349,225 B1
(45) Date of Patent: Feb. 19, 2002

(54) HEARING PROTECTION FOR A WIRELESS COMMUNICATIONS DEVICE

(75) Inventors: Robert Michael Lands; An Tuyen Banh, both of Apex, NC (US)

(73) Assignee: Ericsson Inc., RTP, NC (US)

( * ) Notice: Subject to any disclaimer, the term of this patent is extended or adjusted under 35 U.S.C. 154(b) by 0 days.

(21) Appl. No.: 09/285,221

(22) Filed: Apr. 1, 1999

(51) Int. Cl.$^7$ .................................................. A04M 1/00
(52) U.S. Cl. .......................... 455/575; 455/89; 455/90; 455/569
(58) Field of Search ............................ 455/89, 90, 575, 455/569

(56) References Cited

U.S. PATENT DOCUMENTS

| | | | |
|---|---|---|---|
| 5,265,264 A | | 11/1993 | Dzung et al. |
| 5,276,916 A | | 1/1994 | Pawlish et al. |
| 5,404,582 A | | 4/1995 | Demuro et al. |
| 5,448,620 A | | 9/1995 | Gershkovich et al. |
| 5,535,435 A | * | 7/1996 | Balzano et al. ............. 455/575 |
| 5,537,472 A | | 7/1996 | Estevez-Alcolado et al. |
| 5,542,105 A | * | 7/1996 | Finch et al. ................. 455/575 |
| 5,818,924 A | | 10/1998 | King et al. |
| 5,828,965 A | | 10/1998 | Brown et al. |
| 6,115,620 A | * | 9/2000 | Colonna et al. ............ 455/569 |

FOREIGN PATENT DOCUMENTS

| | | |
|---|---|---|
| EP | 0 472 361 A2 | 8/1991 |
| EP | 0776115 A2 | 5/1997 |
| GB | 2337899 A | 1/1999 |

* cited by examiner

*Primary Examiner*—Daniel Hunter
*Assistant Examiner*—Alan T. Gantt
(74) *Attorney, Agent, or Firm*—Coats & Bennett, P.L.L.C.

(57) ABSTRACT

Wireless communications devices using a given speaker for both handset and speakerphone operation are equipped with a mechanical spacer that automatically inhibits the user from placing the speaker in close proximity to the user's ear when the wireless communications device is in speakerphone mode. The spacer is moved from a normal position to a blocking position to switch the device from handset to speakerphone mode. The mechanical spacer may take a variety of forms, such as an articulating antenna, a moveable frame, a moveable speaker flap, and the like. The extra space between the speaker and the user's ear mandated by the presence of the spacer allows the sound generated by the speaker in speakerphone mode to dissipate somewhat before reaching the user's ear, even when the speaker is held as close as possible, thereby automatically providing hearing protection when the wireless communications device is configured for speakerphone operation. In addition, when wireless communications devices incorporating the present invention are in handset mode, the audio level from the speaker is attenuated before reaching the user's ear. This attenuation may come from electronic means, such as by using a lower amount of amplification, or from mechanical means, such as by blocking or otherwise diminishing the sound generated by the speaker, or both. Thus, a wireless communications device incorporating the present invention automatically provides hearing protection during both handset and speakerphone modes of operation.

18 Claims, 8 Drawing Sheets

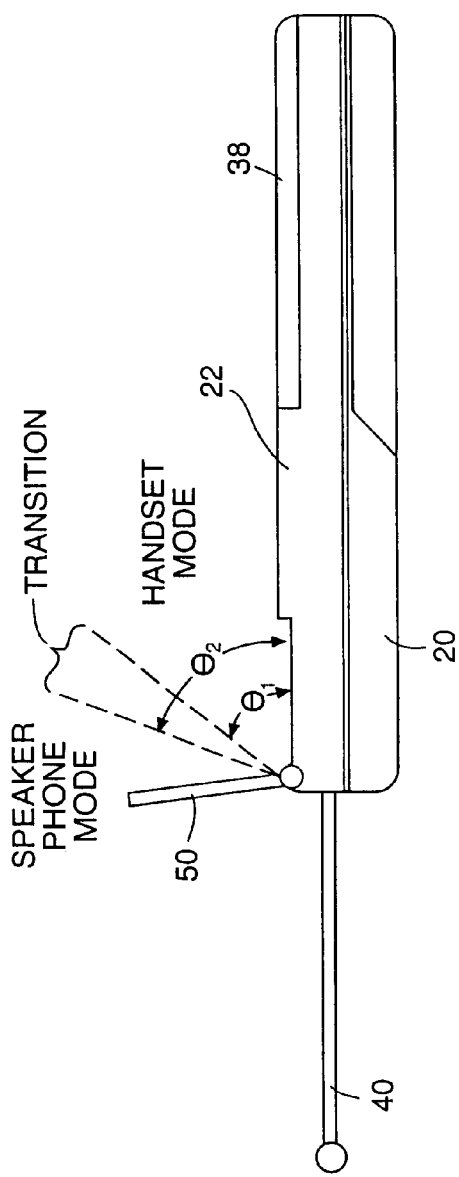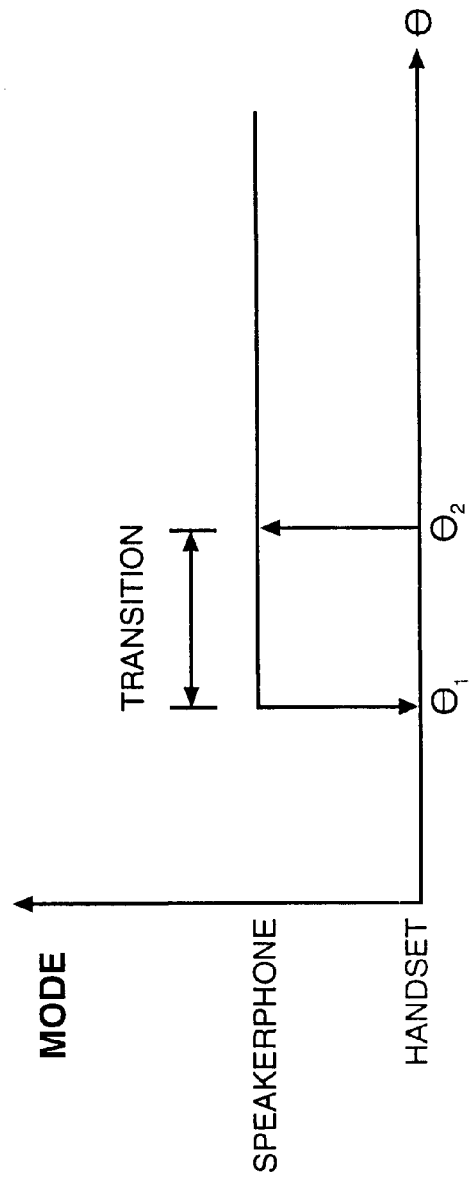

HEARING PROTECTION FOR A WIRELESS COMMUNICATIONS DEVICE

FIELD OF THE INVENTION

The present invention relates to the field of wireless communications devices, and more particularly to hearing protection for users of wireless communications devices.

BACKGROUND OF THE INVENTION

Modern wireless communications devices, such as cellular telephones, are increasingly able to operate in two audio modes. The first audio mode, called handset mode, is the audio mode used for the common situation where the user is holding the wireless communications device close to their head, with a speaker disposed proximate an ear and a microphone, or a microphone inlet, close to their mouth. This handset position of the wireless communications device closely mimics the position of a traditional telephone handset in use. The second audio mode, called speakerphone mode, is the audio mode typically used for the situation where the wireless communications device is not held close to the user's head, but is instead located at some distance away, typically on a nearby table or in a hands-free cradle.

As can be appreciated, the audio level, or volume, of the associated speaker is higher, or louder, in the speakerphone mode than in the handset mode so as to allow proper audio levels to reach the user(s) at a distance and to overcome ambient noise. When the speaker of the wireless communications device is being used in speakerphone mode, the audio volume generated by the speaker should be sufficient to provide ample volume at the distances typically encountered. On the other hand, when the speaker of the wireless communications device is being used in handset mode, the sound volume generated by the speaker should be at a sufficiently low level so that listening will be comfortable to the user.

Sometimes, wireless communications devices are provided with multiple speakers, with one speaker operating in handset mode and the other speaker operating in speakerphone mode. Such a configuration is shown in the patent to Gershkovich et. al., U.S. Pat. No. 5,448,620. However, the use of two distinct speakers adds cost and size to wireless communications devices. Thus, wireless communications devices increasingly rely on a single speaker to provide audio in both handset mode and in speakerphone mode, with different amounts of drive current or power being provided in the different modes. Such phones typically rely on the user to press a keypad button, or the like, to switch between audio modes. Unfortunately, users sometimes to forget to press such a switch when appropriate. If the user has failed to switch into speakerphone mode, no harm is typically encountered and the user can remedy the situation by simply activating the appropriate switch. On the other hand, if the user has failed to switch out of speakerphone mode and thereafter places the wireless communications device in the handset physical position (next to the head), the audio level will be higher than the user may expect, leading to user dissatisfaction.

Accordingly, there is a need for a wireless communications device that automatically provides hearing protection when configured for speakerphone operation.

SUMMARY OF THE INVENTION

Wireless communications devices incorporating the present invention include some sort of mechanical spacer that helps prevent the user from placing the speaker in close proximity to the user's ear when the wireless communications device is in speakerphone mode. The spacer is moved from a normal position to a blocking position to switch the wireless communications device from handset to speakerphone mode. Thus, the mechanical spacer automatically provides hearing protection when the wireless communications device is configured for speakerphone operation. The mechanical spacer, sometimes referred to herein merely as the spacer, may take a variety of forms, such as an articulating antenna, a moveable frame, a moveable speaker flap, and the like. The extra space between the speaker and the user's ear mandated by the presence of the spacer allows the sound generated by the speaker in speakerphone mode to dissipate before reaching the user's ear, even when the speaker is held as close as possible.

In addition to reducing the sound level experience by the user by dissipating the sound over the distance mandated by the spacer, the sound level generated by the speaker may additionally be attenuated by mechanical and/or electrical means. By attenuation it is meant that the sound level leaving the wireless communications device is reduced. For instance, this attenuation may come from electronic means, such as by using a lower amount of amplification, or from mechanical means, such as by blocking or otherwise diminishing the sound generated by the speaker, or both.

Thus, wireless communications devices incorporating the present invention automatically provide hearing protection during both handset and speakerphone modes of operation.

BRIEF DESCRIPTION OF THE DRAWINGS

FIG. 5A is a schematic side view of the phone of FIGS. 3A–B showing the transition zone between operating modes.

FIG. 5B is a graphical illustration of the transition zone of FIG. 4.

DETAILED DESCRIPTION

For purposes of illustration, a common cellular telephone 100 will be used as an illustrative example of a wireless communications device in order to describe the operation of the present invention. However, the present invention is not limited to cellular telephones, but also encompasses satellite telephones, personal digital assistants, and all other wireless communications devices that use the same speaker 34 in both normal and speakerphone modes.

Figure 1:
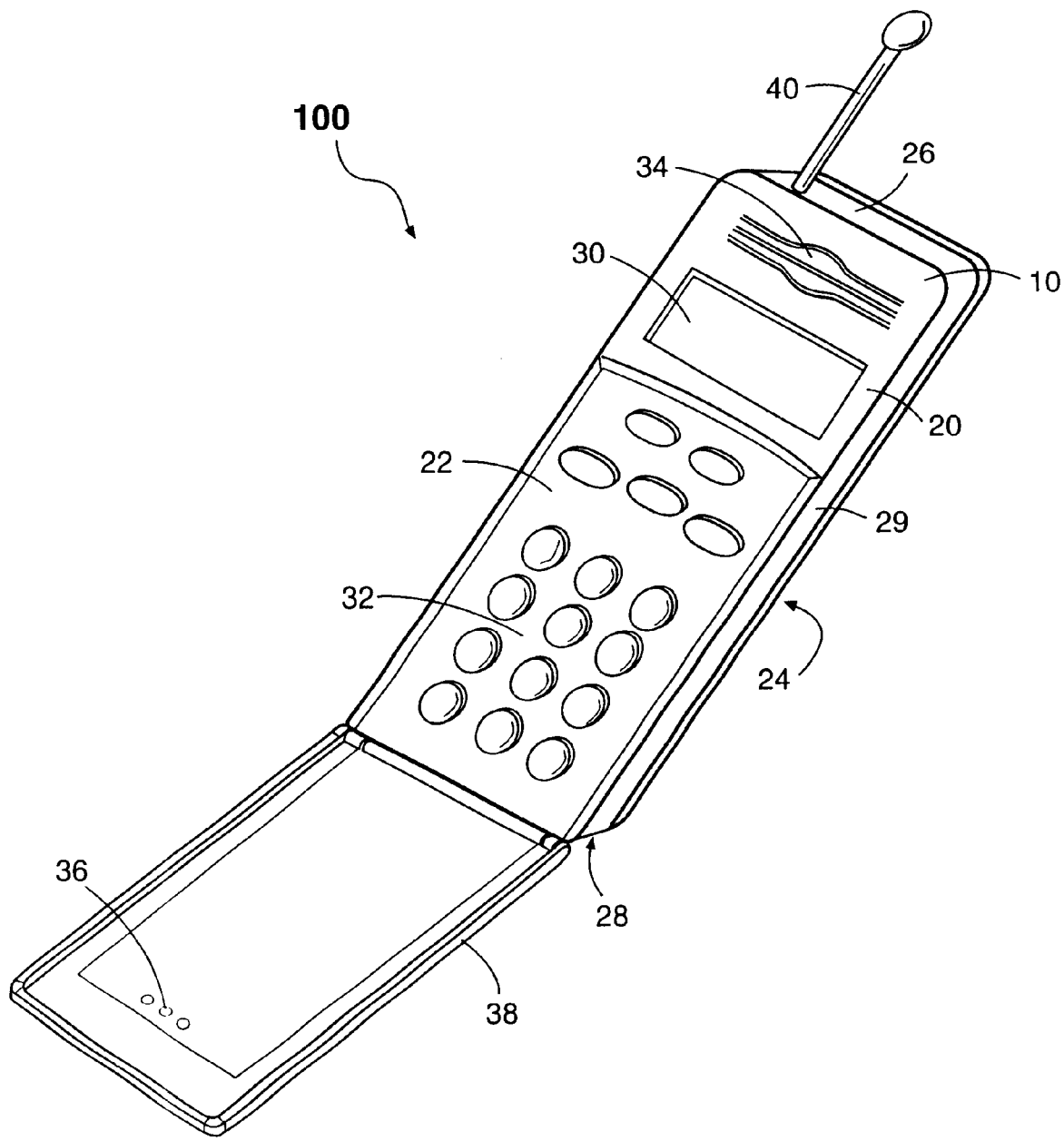
FIG. 1 is a perspective view of a typical cellular telephone of the prior art.

A typical cellular telephone 100, such as that shown in FIG. 1, includes various electronics of a type well known in the art. Surrounding the electronics is a housing 10 that typically houses a display 30, a keypad 32, a speaker 34, and a microphone input 36. The housing 10 typically includes a main body 20 and a flip cover 38 moveably attached to the main body 20, such as by a plurality of hinges. The main body 20 has a front face 22, a top 26, a bottom 28, a rear 24, and sides 29. An antenna 40 is attached to and extends outwardly from the main body 20, typically from the top 26 of the main body 10.

The phone 100 described above is operable in two audio modes, referred to herein as handset and speakerphone modes. The phone 100 uses the speaker 34 in both modes, with the perceived audio level or volume higher (louder) in speakerphone mode and lower (quieter) in handset mode. In normal handset operation, the user opens the flip cover 38, and holds the phone 100 in close proximity to their head with the microphone input 36 on the flip cover 38 near their mouth and the speaker 34 near their ear.

In normal speakerphone operation, the phone 100 is placed on nearby suitable surface, such as on a table or desk, with the flip cover 38 either open or closed. Speakerphone mode is enabled by moving a spacer from a first "normal" position to a second "blocking" position. In the second position, the spacer physically blocks the user from holding the speaker 34 as close to their ear in speakerphone mode as is possible in handset mode. An existing component of the phone 100 may serve as the spacer; alternatively a discrete spacer may be incorporated into the phone 100. This physical blocking may be accompanied by some sort of electrical or mechanical attenuation of the speaker 34 in handset mode. Such an inventive approach may be accomplished through a variety of embodiments, some of which are illustrated below.

Figure 2A:
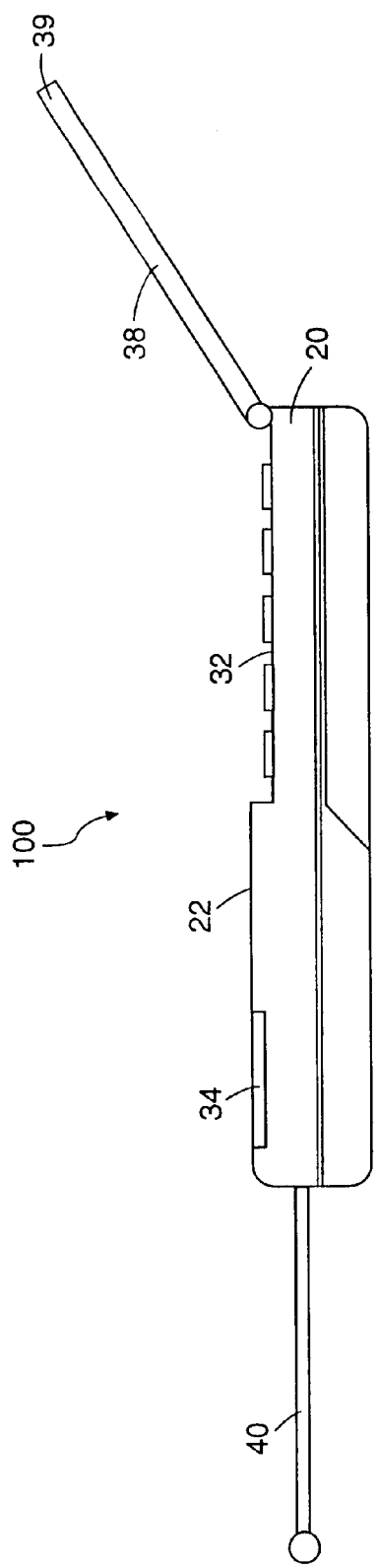
FIGS. 2A–B are a side views of a cellular telephone of the present invention, in the handset and speakerphone modes respectively, showing an antenna used as the spacer.
Figure 2B:
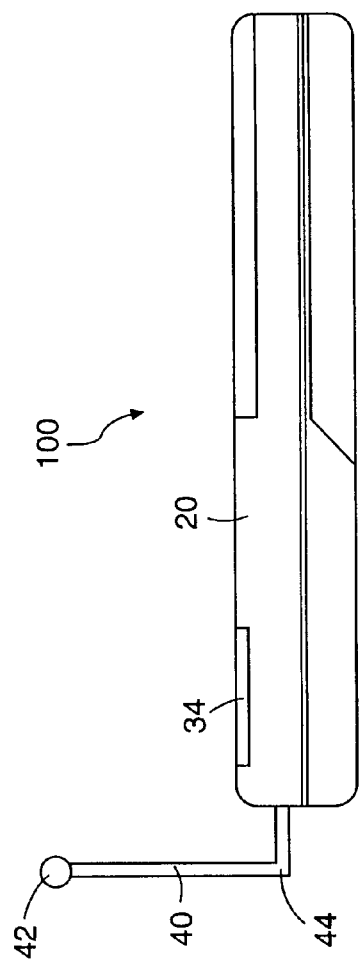

FIGS. 2A–B show an embodiment where the antenna 40 is used as the spacer. In such embodiments, the antenna 40 includes a joint 44 somewhere along its length, preferably near the end closest to the main body 20 of the housing 10. This joint 44 allows the terminal end 42 of the antenna 40 to be articulated from a plane approximately parallel to the front face 22 of the main body 20 (FIG. 2A) to a position approximately normal to such a plane. In this manner, the terminal end 42 of the antenna 40 protrudes outwardly from the plane of the front face 22 (FIG. 2B). In such a position, when a user places the phone 100 in a typical handset orientation near their head, the antenna 40 serves as a spacer between the speaker 34 of the phone 100 and the user's ear. For ease of reference, when the antenna 40 is in the generally straight configuration (FIG. 2A), it will be referred to as being in the "normal position" and when the antenna 40 is in the bent configuration (FIG. 2B), it will be referred to as being in the "blocking position." Suitable means, such as an electrical switch associated with the joint 44, should be provided to allow the electronics of the phone 100 to detect when the antenna 40 is in the blocking position.

The phone 100 is switched between handset and speakerphone mode by changing the position of the antenna 40. When the antenna 40 is in the normal position, the phone 100 operates in handset mode. When the antenna 40 is moved to the blocking position, the phone 100 operates in speakerphone mode.

Figure 3:
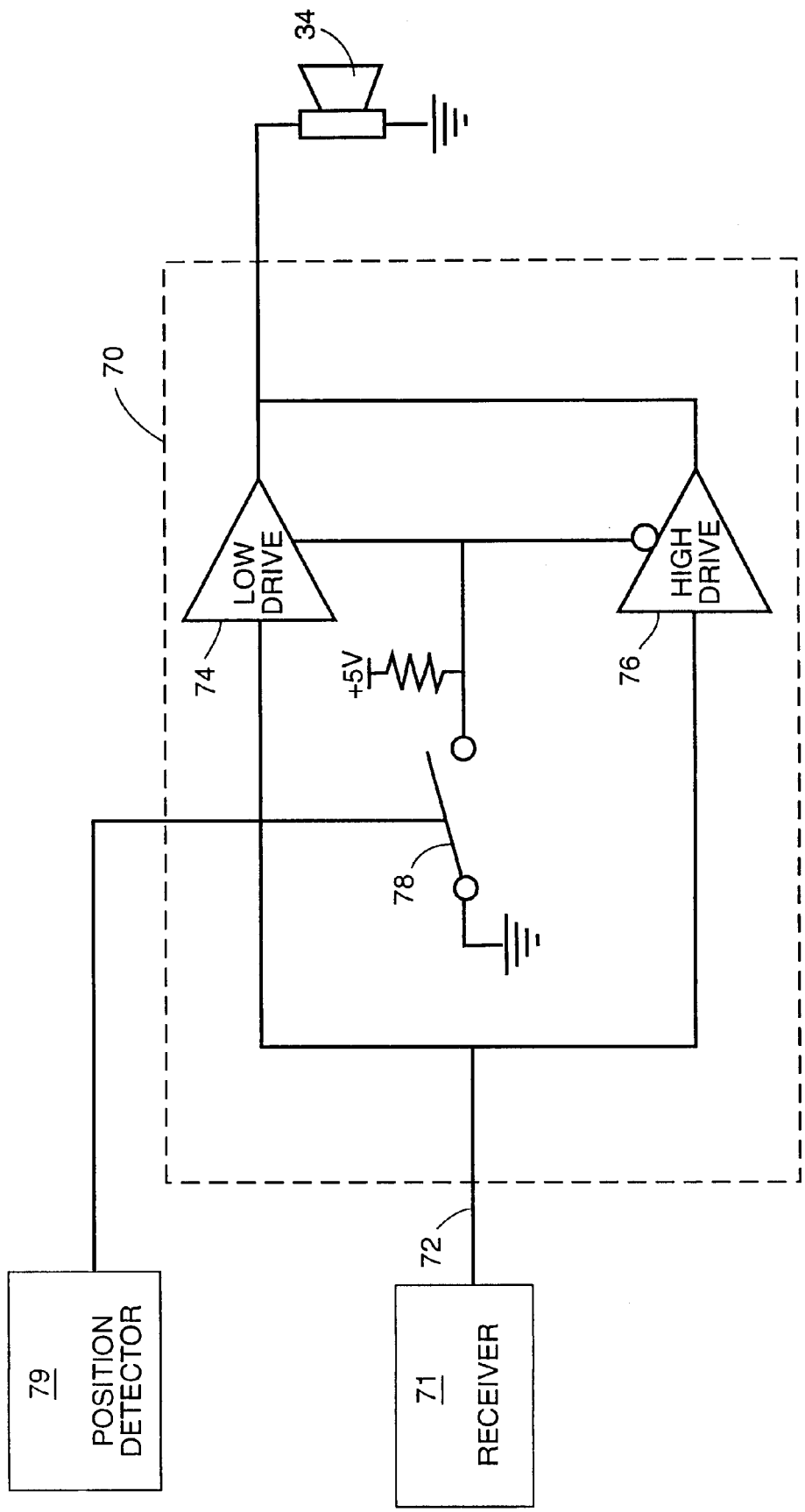
FIG. 3 is a schematic of one embodiment of a switching circuit for controlling the acoustic mode of the speaker.

Any suitable electronic means may be used to change audio modes. For instance, the electrical speaker mode switching circuit 70 shown in FIG. 3 could be used to switch between audio modes. The audio signal intended for the speaker 34, such as one from a receiver 71, would be taken from an audio line 72 and fed in parallel to two amplifiers 74,76. A spacer position detector 79 could open or close an amplifier enable switch 78 depending on the position of the spacer. For instance, the position detector 79 could be a common make-before-break rotary switch located in the antenna 40 that sends a low signal (opening the amplifier enable switch 78) when the antenna 40 is in the normal position and a high signal (closing the amplifier enable switch 78) when the antenna 40 is in the blocking position. Alternatively, the position detector 79 may be any electrical or electromechanical device that can detect the position of a movable member, such as a reed switch, an optical switch, a variable resistance potentiometer, a slide switch, and the like. The first amplifier 74, the low drive amplifier, would be for handset mode operation and would provide a lower amount of amplification. The second amplifier 76, the high drive amplifier, would be for speakerphone mode operation and would provide a higher amount of amplification. The amplifier enable switch 78 would enable one of the amplifiers 74,76, and disable the other 76,74, depending on the input from the position detector 79. In addition, the signal from the position detector 79 could also be used to make other changes to the electronics of the phone 100, such as changing the sensitivity of the microphone input 36 and other operating characteristics known in the art. The circuit shown in FIG. 3 is only one example of a suitable speaker mode switching circuit 70, and is not intended to be limiting.

Figure 4A:
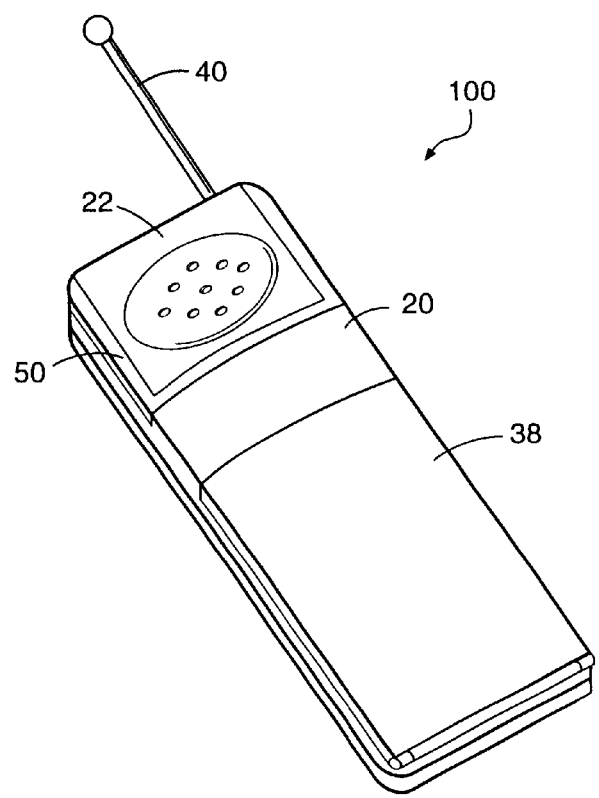
FIGS. 4A–B are a side views of a cellular telephone of the present invention, in the handset and speakerphone modes respectively, showing a frame used as the spacer.
Figure 4B:
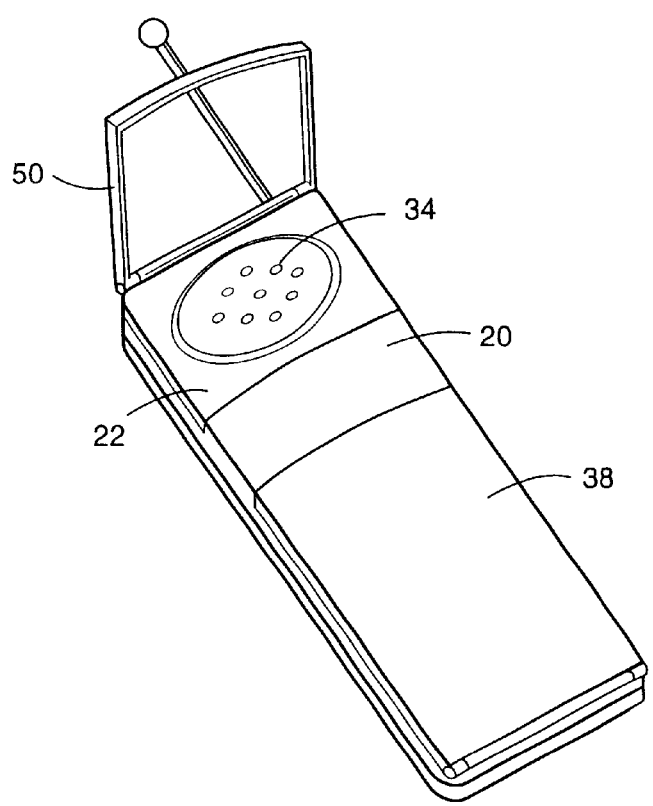

As an alternative to the embodiment described above, the phone 100 may include a frame 50 that is used as the controlling spacer rather than the antenna 40. For instance, the phone 100 may include a generally U-shaped frame 50 that is pivotally attached to the main body 20 of the housing 10 in a manner similar to the flip cover 38. See FIGS. 4A–B. The frame 50 would be moveable between a normal position wherein the frame 50 lies substantially against the front face 22 of the phone 100 (FIG. 4A) and a blocking position wherein the frame 50 extends out from the front face 22 of the phone 100 (FIG. 4B). When the frame 50 is in the normal position, the phone 100 operates in handset mode. When the frame 50 is moved to the blocking position, phone 100 operates in speakerphone mode and the frame 50 provides a mechanical spacer between the front face 22 and speaker 34 and the user's ear. As with the antenna-as-moveable-member embodiments, suitable means, such as an electrical detector switch associated with the frame 50, should be provided to allow the electronics of the phone 100 to detect when the frame 50 is in the blocking position, allowing the speaker 34 to operate at higher audio levels.

It may be desirable for the transition between the handset and speakerphone modes to allow for some hysteresis in the movement of the spacer. For instance, with the frame 50 described immediately above, it may be desirable to switch between operational modes as indicated in FIGS. 5A–B. From the normal position, with the frame 50 lying parallel to the front face 22 of the main body 20, the phone 100 may operate in handset mode for $\theta$ less than $\theta_1$ and operate in speakerphone mode for $\theta$ greater than $\theta_2$. For the transition region between $\theta_1$ and $\theta_2$, the operation will depend on whether the frame 50 is being opened or closed. If the frame 50 is being opened, the phone 100 should operate in handset mode until $\theta$ is larger than $\theta_2$. Conversely, if the frame 50 is being closed, the phone 100 should operate in speakerphone mode until $\theta$ is less than $\theta_1$. Such functionality may be easily achieved by use of any make-before-break rotary switch known in the art connecting the frame 50 to the main body 20. While the precise values of $\theta_1$ and $\theta_2$ are a matter of design choice, $\theta_2$ is preferably at least 80° or more, while $\theta_1$, is preferably 50° or more. It should be noted that the frame 50 may be rotated beyond 90°, but preferably not more than about 120° to provide optimum physical blocking.

Figure 6A:
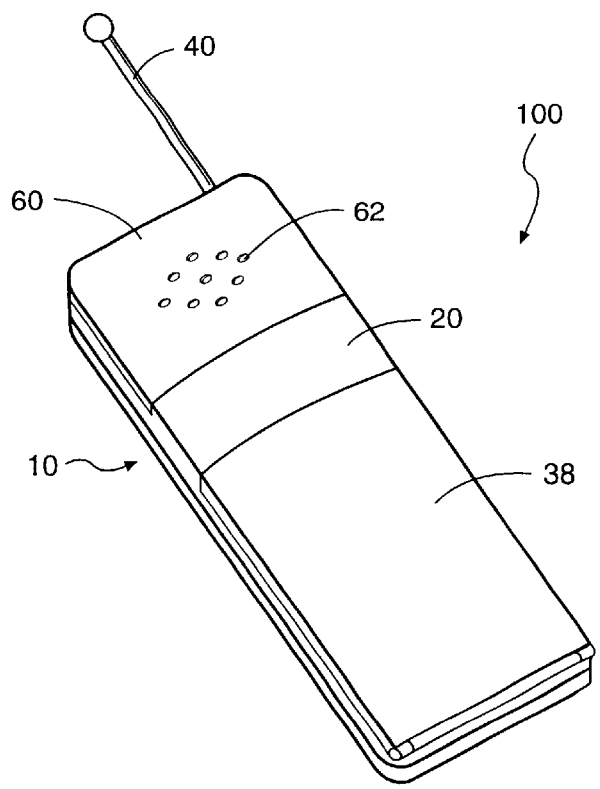
FIGS. 6A–B are a side views of a cellular telephone of the present invention, in the handset and speakerphone modes respectively, showing a speaker flap used as the spacer.
Figure 6B:
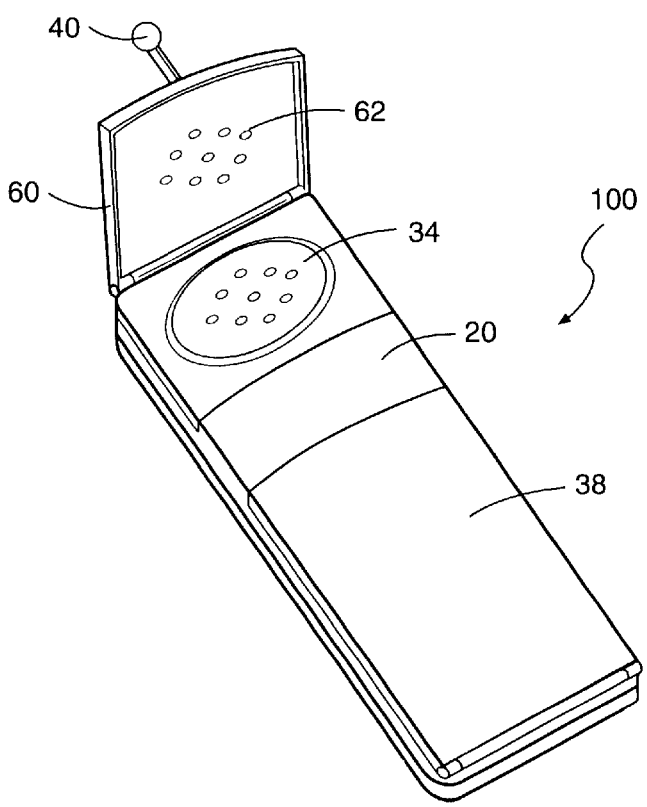

In some embodiments, the spacer provides physical attenuation of the speaker's audio output when the spacer is in the normal position. For instance, the frame 50 of FIGS. 4A–B could be changed to a speaker flap 60 as shown in FIGS. 6A–B. Such a speaker flap 60 is preferably generally flat with a plurality of holes 62 therethrough. When the speaker flap 60 is in the normal position (FIG. 6A), the holes 62 are disposed outwardly from the speaker 34. The holes 62 allow some, but not all, of the sound from the speaker 34 to escape. That is, that portion of the speaker flap 60 overlaying the speaker 34 partially attenuates the speaker's output in the normal position. When the speaker flap 60 is moved to the blocking position (FIG. 6B), the speaker flap 60 no longer overlays the speaker 34, and the speaker output is not attenuated by the speaker flap 60. While a electronic speaker mode switching circuit 70 may be used in such embodiments, it is not required. Instead, the speaker 34 may generate the same level of audio output in both the handset and the speakerphone modes, with the necessary attenuation being provided by the speaker flap 60.

Figure 7:
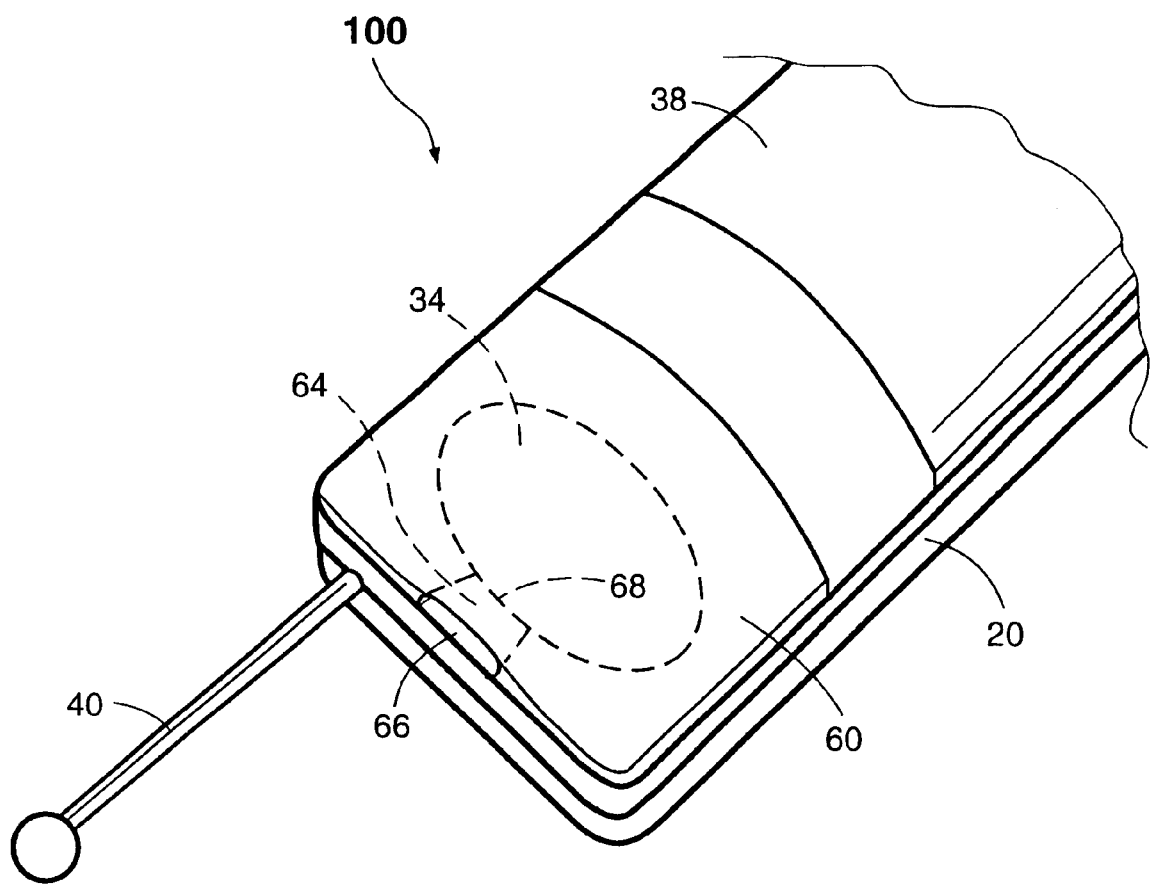
FIG. 7 is a partial perspective view of a cellular telephone of the present invention in the handset mode, showing an acoustic channel in the speaker flap.

In a further embodiment, the speaker flap 60 may include an acoustic port 66 instead of, or in addition to, the holes 62 described above. See FIG. 7. The acoustic port 66 should be the end portion of an acoustic channel 64, such as one formed by a raised portion of the speaker flap 60. The input end 68 of the acoustic channel 64 would acoustically communicate with the speaker 34, with sound from the speaker 34 travelling through the acoustic channel 64 and out the acoustic port 66. The size, shape, and other details of the acoustic channel 64 will depend upon various design considerations in a manner well known in the acoustic channel art. The acoustic port 66 should preferably be pointed in a direction away from the front face 22 of the phone 100, such as towards the top 26 of the phone 100 as shown in FIG. 7. To operate in handset mode, the speaker flap 60 would be closed. The speaker flap 60 would attenuate sounds from the speaker 34 in the direction of the front face 22. In addition, the sound would be directed towards the acoustic port 66. In normal "handset" use by a user, the acoustic port 66 would be pointed parallel to the users head, and not directed at the user's ear. Therefore, the sound volume entering the user's ear should be reduced. In addition, there should be some attenuation of the sound by its passage through the acoustic channel 64. Thus, even without changing the electronic audio input to the speaker 34, the sound generated thereby should be quieter to a user in the handset mode, i.e., when the speaker flap 60 is in the normal position. To operate in speakerphone mode, the speaker flap 60 is opened to the blocking position, thereby uncovering the speaker 34. Preferably, the speaker flap 60 is opened approximately ninety degrees and held in that position, such as by a catch or detent mechanism. With the speaker flap 60 open, the audio from the speaker 34 is not attenuated by the speaker flap 60, thereby producing a louder sound. Note that with the speaker flap 60 in the blocking position the user is inhibited from holding the speaker 34 in close proximity to the user's ear.

Figure 8A:
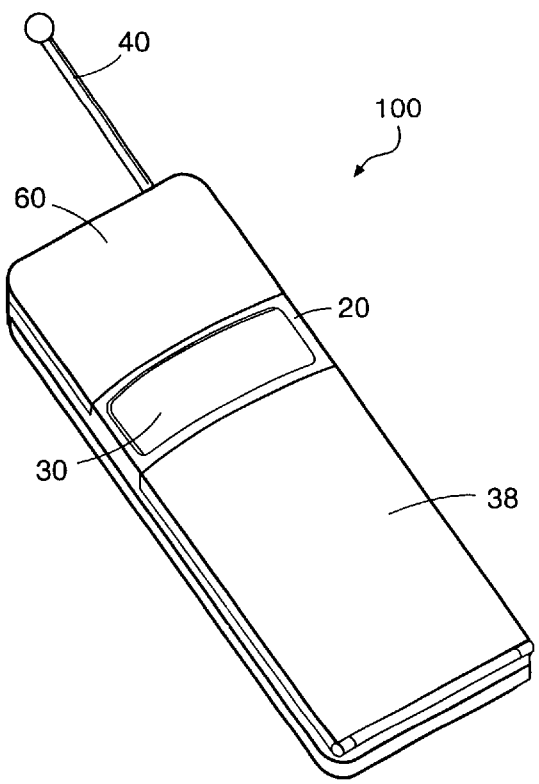
FIGS. 8A–B are a side views of a cellular telephone of the present invention, in the handset and speakerphone modes respectively, showing the speaker in the speaker flap.
Figure 8B:
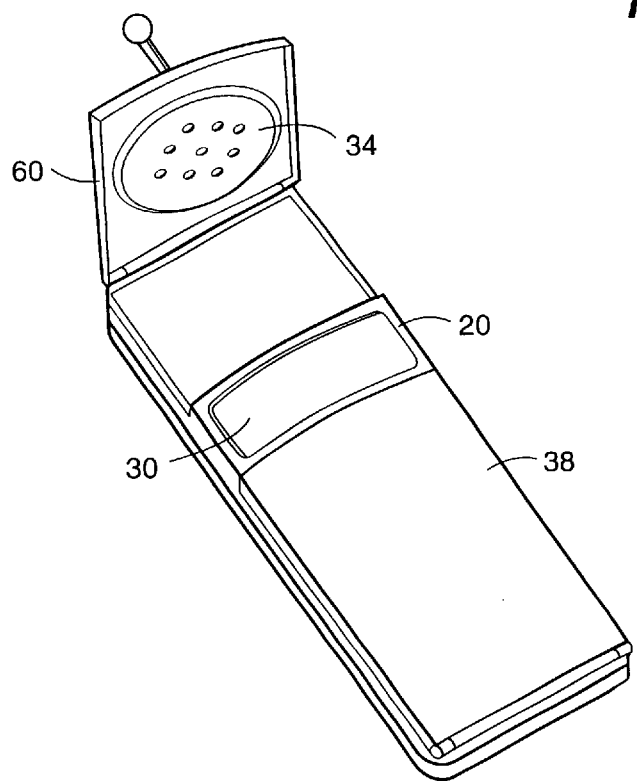

The embodiment described immediately above has assumed that the speaker 34 is in the main body 20 of the housing 10. However, this is not required. Instead, the speaker 34 could be in the spacer itself. For instance, the speaker 34 could be in the speaker flap 60 of FIGS. 6A–B, as shown in FIGS. 8A–B. With such a position, the speaker 34 would be facing the main body 20 when the speaker flap 60 is in the normal position (FIG. 8A). Ideally, the speaker flap 60 would form a closed space with the main body 20 in the normal position, thereby substantially trapping the audio output from the speaker 34 inside. Thus, the audio output from the speaker 34 would be at least physically attenuated in the handset mode. Of course, the speaker volume could also be electrically attenuated, but this is not required. In the speakerphone mode, the speaker flap 60 would be opened to the blocking position, thereby changing the output direction of the speaker 34 as shown in FIG. 8B. With the speaker flap 60 in the blocking position, the apparent speaker volume to the user is higher. It should be noted that the speaker flap 60 may optionally include the holes 62 and/or acoustic channel 64 and acoustic port 66 described above. Thus, it is not important whether the speaker 34 is in the main body 20 or the speaker flap 60. Either way, the speaker flap 60 in the normal position provides attenuated audio suitable for handset mode operation and the speaker flap 60 in blocking position provides a physical spacer near the speaker 34 to prevent placing the speaker 34 in close proximity to the user's ear so as to protect the user from the higher volumes associated with speakerphone mode operation.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A wireless communications device, comprising:
   a) a speaker for generating sounds at a first audio level in a first mode and at a second audio level in a second mode, wherein said first audio level Is lower than said second audio level:
   b) a first housing portion;
   c) a spacer attached to said first housing portion and moveable between a normal and a blocking position, wherein said spacer is an articulating antenna assembly;
   d) wherein said speaker operates according to said first mode when said spacer is in said normal position and operates according to said second mode when said spacer Is In said blocking position; and
   e) wherein said spacer in said blocking position physically prevents said speaker from being placed against a users ear.

2. The wireless communications device of claim 1 wherein said speaker is disposed within said first housing portion.

3. The wireless communications device of claim 1 further including a receiver for receiving radio signals and wherein said speaker generates sounds based on said received radio signals at said first audio level in said first mode and wherein said speaker generates sounds based on said received radio signals at said second audio level in said second mode.

4. The wireless communications device of claim 1 further including a sensor for detecting when the spacer is in said normal position and a speaker circuit for controlling the audio volume of said speaker, wherein said speaker circuit is responsive to said sensor to lower the audio level of said speaker when said spacer is in said normal position.

5. A wireless communications device, comprising:
   a) a first housing portion;

b) a receiver disposed substantially within said first housing portion for receiving radio signals;

c) a speaker for generating sounds based on said received radio signals at at least one audio level:

d) a spacer attached to said first housing portion and moveable between a first and a second position, wherein said spacer includes said speaker an-d wherein said speaker is directed towards said first housing portion when said spacer is in said first position;

e) wherein said spacer mechanically attenuates the sound produced by said speaker in said first position to provide an attenuated audio output than when said spacer Is in said second position; and f) wherein said spacer in said second position physically prevents said speaker from being placed against a users ear.

6. The wireless communications device of claim 5 further including a sensor for detecting the position of the spacer and a speaker circuit for electrically controlling the audio volume of said speaker based on the position of said spacer.

7. The wireless communications device of claim 6 wherein said sensor is a rotary switch.

8. The wireless communications device of claim 7 wherein said rotary switch is a make-before-break type switch.

9. A wireless communications device, comprising:

a first housing portion;

a receiver disposed substantially within said first housing portion for receiving radio signals;

a speaker for generating sounds based on said received radio signals at at least one audio level;

a spacer attached to said first housing portion and moveable between a first and a second position, wherein said spacer includes said speaker and wherein said speaker is directed towards said first housing portion when said spacer is in said first position;

wherein said spacer mechanically attenuates the sound produced by said speaker in said first position to provide an attenuated audio output than when said spacer is in said second position;

wherein said spacer in said second position physically prevents said speaker from being placed against a user's ear; and wherein said spacer includes an acoustic channel having an input and an output port, wherein said input is directed at said speaker when said spacer is in said first position.

10. A wireless communications device, comprising:

a first housing portion;

a receiver disposed substantially within said first housing portion for receiving radio signals;

a speaker for generating sounds based on said received radio signals at at least one audio level;

a spacer attached to said first housing portion and moveable between a first and a second position, wherein said spacer includes said speaker and wherein said speaker is directed towards said first housing portion when said spacer is in said first position;

wherein said spacer mechanically attenuates the sound produced by said speaker in said first position to provide an attenuated audio output than when said spacer is in said second position;

wherein said spacer in said second position physically prevents said speaker from being placed against a user's ear; and wherein said first housing portion includes an acoustic channel having an input and an output port, wherein said input is directed at said speaker when said spacer is in said first position.

11. A method of providing hearing protection in a wireless communications device having a housing and a speaker for generating sounds based on received radio signals and including a spacer attached to said first housing portion and moveable between a normal and a blocking position, comprising:

mechanically attenuating the volume of said speaker when a spacer is in said normal position by said spacer at least partially overlaying said speaker in said normal position and not attenuating the volume of said speaker when said spacer Is in said blocking position;

wherein said spacer in said blocking position physically prevents said speaker from being placed against a user's ear;

wherein said housing includes a front face and a rear face and wherein said spacer includes an acoustic channel having an acoustic outlet port said acoustic outlet port being directed approximately parallel to said front face of said housing when said spacer is in said normal position.

12. A method of providing hearing protection in a wireless communications device having a housing and a speaker for generating sounds based on received radio signals and including a spacer attached to said first housing portion and moveable between a normal and a blocking position, comprising:

detecting when said spacer is in said normal position;

electronically attenuating the volume of said speaker in response to said detecting and not attenuating the volume of said speaker when said spacer is in said blocking position;

wherein said spacer in said blocking position physically prevents said speaker from being placed against a user's ear; and wherein said spacer is an antenna.

13. A wireless communications device, comprising:

a first housing portion;

a receiver disposed substantially within said first housing portion for receiving radio signals;

a speaker for generating sounds based on said received radio signals at at least one audio level;

a spacer attached to said first housing portion and moveable between a first and a second position;

wherein said spacer In said second position tends to inhibit the placement of said speaker against a users ear; and wherein said spacer mechanically attenuates the sound produced by said speaker in said first position and wherein said spacer does not attenuate the sound produced by said speaker in said second position.

14. The wireless communications device of claim 13 wherein said spacer in said first position tends not to inhibit the placement of said speaker in close proximity to a user's ear.

15. The wireless communications device of claim 13 wherein said speaker generates sounds at a first audio level in a first mode and at a second audio level in a second mode, wherein said first audio level is lower than said second audio level and wherein said speaker operates according to said first mode when said spacer is in said first position.

16. The wireless communications device of claim 13 wherein said spacer includes said speaker and wherein said speaker is directed towards said first housing portion when said spacer is in said first position.

17. The wireless communications device of claim 13 wherein said first housing portion includes said speaker and wherein said speaker is directed towards said spacer when said spacer is in said first position.

18. A wireless communications device, comprising:
- a first housing portion;
- a receiver disposed substantially within said first housing portion for receiving radio signals;
- a speaker for generating sounds based on said received radio signals at at least one audio level;
- a spacer attached to said first housing portion and moveable between a first and a second position;
- wherein said spacer in said second position tends to inhibit the placement of said speaker against a user's ear;
- wherein said spacer mechanically attenuates the sound produced by said speaker in said first position and wherein said spacer does not attenuate the sound produced by said speaker in said second position; and
- wherein said spacer includes an acoustic channel having an input and an output port, wherein said input is directed at said speaker when said spacer is in said first position.

* * * * *